(12) United States Patent
Hu et al.

(10) Patent No.: US 12,280,660 B2
(45) Date of Patent: Apr. 22, 2025

(54) TRANSMISSION SYSTEM CAPABLE OF IMPLEMENTING FOUR-WHEEL DRIVE AND OPERATING MODEL THEREOF

(71) Applicants: CHONGQING UNIVERSITY, Chongqing (CN); CHONGQING CHANGAN NEW ENERGY AUTOMOBILE TECHNOLOGY CO., LTD., Chongqing (CN); CHONGQING CHANGAN AUTOMOBILE CO., LTD., Chongqing (CN)

(72) Inventors: Minghui Hu, Chongqing (CN); Anjian Zhou, Chongqing (CN); Dongyang Wang, Chongqing (CN); Ling Su, Chongqing (CN); Chunyun Fu, Chongqing (CN); Kaibin Cao, Chongqing (CN); Datong Qin, Chongqing (CN); Chenghao Deng, Chongqing (CN); Dongye Sun, Chongqing (CN); Guoqing Jin, Chongqing (CN); Jianjun Hu, Chongqing (CN); Wankai Shi, Chongqing (CN); Changhong Du, Chongqing (CN)

(73) Assignees: CHONGQING UNIVERSITY, Chongqing (CN); CHONGQING CHANGAN NEW ENERGY AUTOMOBILE TECHNOLOGY CO., LTD., Chongqing (CN); CHONGQING CHANGAN AUTOMOBILE CO., LTD., Chongqing (CN)

( * ) Notice: Subject to any disclaimer, the term of this patent is extended or adjusted under 35 U.S.C. 154(b) by 0 days.

(21) Appl. No.: 17/263,245

(22) PCT Filed: May 27, 2020

(86) PCT No.: PCT/CN2020/092604
§ 371 (c)(1),
(2) Date: Jan. 26, 2021

(87) PCT Pub. No.: WO2020/238956
PCT Pub. Date: Dec. 3, 2020

(65) Prior Publication Data
US 2025/0033464 A1 Jan. 30, 2025

(30) Foreign Application Priority Data

May 27, 2019 (CN) .................. 201910445649.7

(51) Int. Cl.
*B60K 17/344* (2006.01)
*B60K 1/02* (2006.01)
(Continued)

(52) U.S. Cl.
CPC ............ *B60K 17/344* (2013.01); *B60K 17/06* (2013.01); *B60K 23/08* (2013.01); *F16H 59/42* (2013.01);
(Continued)

(58) Field of Classification Search
CPC ...... B60K 17/344; B60K 17/06; B60K 23/08; B60K 1/02; B60K 17/34–3467; F16H 59/42; F16H 61/688; F16H 2200/0021
See application file for complete search history.

(56) References Cited

U.S. PATENT DOCUMENTS

| 2019/0078672 A1 | 3/2019 | Duan et al. | |
| 2020/0238807 A1* | 7/2020 | Yu | F16H 3/091 |
| 2020/0292041 A1* | 9/2020 | Zheng | F16H 48/36 |

FOREIGN PATENT DOCUMENTS

| CN | 102362097 A | 2/2012 |
| CN | 104114397 A | 10/2014 |

(Continued)

OTHER PUBLICATIONS

PCT Search Report and Written Opinion for PCT/CN2020/092604 dated Aug. 26, 2020 (10 pages).

*Primary Examiner* — Tinh Dang

(57) ABSTRACT

The disclosure discloses a transmission system capable of implementing four-wheel drive and an operating model thereof. The transmission system includes an odd shift motor, an even shift motor, a front-wheel drive shaft, a rear-wheel drive shaft, a front-wheel output shaft gear disposed on the front-wheel drive shaft, and a rear-wheel output shaft gear disposed on the rear-wheel drive shaft. The front-wheel output shaft gear and the rear-wheel output shaft gear are connected by a front/rear drive shaft coupling sleeve. In the disclosure, coordinated control of two motors allows the motors to operate with high efficiency to the maximum, which improves the efficiency of the transmission system. A four-wheel drive model and a two-wheel drive model are implemented through the coordinated control of two motors. Moreover, in the disclosure, sensor information is used to synchronously control a rotational speed during gear shift, which can reduce the impact during the gear shift.

20 Claims, 4 Drawing Sheets

(51) Int. Cl.
    *B60K 17/06*      (2006.01)
    *B60K 23/08*      (2006.01)
    *F16H 59/42*      (2006.01)
    *F16H 61/688*     (2006.01)

(52) U.S. Cl.
    CPC ............. *F16H 61/688* (2013.01); *B60K 1/02* (2013.01); *F16H 2200/0021* (2013.01)

(56) References Cited

FOREIGN PATENT DOCUMENTS

| | | | | |
|---|---|---|---|---|
| CN | 104972890 B | * | 6/2017 | ............ Y02T 10/62 |
| CN | 108340760 A | | 7/2018 | |
| CN | 110171292 A | | 8/2019 | |
| EP | 3239559 A1 | | 11/2017 | |
| JP | 2011033077 A | * | 2/2011 | ............ B60K 1/02 |
| JP | 6193092 B2 | * | 9/2017 | ............ B60K 1/02 |
| JP | 2018100709 A | | 6/2018 | |

* cited by examiner

TRANSMISSION SYSTEM CAPABLE OF IMPLEMENTING FOUR-WHEEL DRIVE AND OPERATING MODEL THEREOF

PRIORITY CLAIM

This application is a 371 filing of PCT/CN2020/092604 filed Dec. 3, 2020, which claims priority to Chinese Patent Application No. 201910445649.7 filed May 27, 2019, entitled "TRANSMISSION SYSTEM CAPABLE OF IMPLEMENTING FOUR-WHEEL DRIVE AND OPERATING MODEL THEREOF", the disclosures of which are incorporated herein by reference in their entirety.

TECHNICAL FIELD

The disclosure relates to the field of vehicle transmission, and in particular, to a transmission system capable of implementing four-wheel drive and an operating model thereof.

BACKGROUND

Different from a manual transmission, an automatic transmission is a type of transmission that can automatically shift gears based on vehicle and engine speeds. At present, automatic transmissions can be classified into hydraulic automatic transmissions (AT), automated mechanical transmissions (AMT), continuously variable transmissions (CVT), and dual-clutch transmissions (DCT).

The DCT is a power transmission device obtained by combining and optimizing two AMTs. Gear shift without power interruption is implemented through coordinated control of two clutches (one clutch is disengaged, while the other is engaged). The power transmission of the DCT during gear shift is completed through engagement and disengagement of the two clutches. Torque transmission of the clutches is implemented through friction between a driving plate and a driven plate. Energy loss occurs because of the friction during the power transmission. In addition, the friction leads to a large amount of heat. Consequently, the clutches are easy to ablate, and power transmission performance of the clutches is affected.

Motors feature constant torque at low speeds, constant power at high speeds, high response speeds, etc. Based on these features, applying a drive motor to a vehicle drive system can reduce the quantity of gears disposed in a gearbox and the weight of the power transmission system. A disadvantage of using single-motor drive is as follows: A large-volume motor is required for high power and torque. Vehicles require relatively high torque at high speeds in some operating conditions. In a high-speed stage, motor torque decreases non-linearly, which fails to meet this requirement.

SUMMARY

The disclosure aims to provide a transmission system capable of implementing four-wheel drive and an operating model thereof. Two motors are combined. Rapid response control of the two motors is used instead of clutch control, implementing a four-wheel drive function without power interruption.

To achieve the above purpose, the disclosure provides the following technical approaches.

A transmission system capable of implementing four-wheel drive includes: an odd shift motor, an even shift motor, a front-wheel drive shaft, a rear-wheel drive shaft, a front-wheel output shaft gear disposed on the front-wheel drive shaft, and a rear-wheel output shaft gear disposed on the rear-wheel drive shaft, where the front-wheel output shaft gear and the rear-wheel output shaft gear are connected by a front/rear drive shaft coupling sleeve; a first driving gear on an odd shaft and a second driving gear on an odd shaft are disposed on an output shaft of the odd shift motor along a direction away from the odd shift motor; wherein the first driving gear on an odd shaft is engaged with a first driven gear on an odd shaft, the second driving gear on an odd shaft is engaged with a second driven gear on an odd shift, and the first driven gear on an odd shaft and the second driven gear on an odd shaft are connected by a first coupling sleeve; an odd shift intermediate shaft that penetrates the first driven gear on an odd shaft, the second driven gear on an odd shaft, and the first coupling sleeve is further included; a first output gear on an odd shaft that is engaged with the rear-wheel output shaft gear and a second output gear on an odd shaft that is engaged with the front-wheel output shaft gear are further disposed on the odd shift intermediate shaft; wherein the first output gear on an odd shaft and the second output gear on an odd shaft are connected by a second coupling sleeve; a first driving gear on an even shaft and a second driving gear on an even shaft are disposed on an output shaft of the even shift motor along an direction away from the even shift motor; wherein the first driving gear on an even shaft is engaged with a first driven gear on an even shaft, the second driving gear on an even shaft is engaged with a second driven gear on an even shaft, and the first driven gear on an even shaft and the second driven gear on an even shaft are connected by a third coupling sleeve; an even shift intermediate shaft that penetrates the first driven gear on an even shaft, the second driven gear on an even shaft, and the third coupling sleeve is further included; a first output gear on an even shaft that is engaged with the rear-wheel output shaft gear and a second output gear on an even shaft that is engaged with the front-wheel output shaft gear are further disposed on the even shift intermediate shaft; and wherein the first output gear on an even shaft and the second output gear on an even shaft are connected by a fourth coupling sleeve.

Optionally, the transmission system capable of implementing four-wheel drive further includes a speed sensor, where the speed sensor is connected to the first driving gear on an odd shaft and configured to monitor the speed of the first driving gear on an odd shaft.

Optionally, the rear-wheel drive shaft is further connected to a rear shaft differential, and the front-wheel drive shaft is further connected to a front shaft differential.

The disclosure further provides an operating model of a transmission system capable of implementing four-wheel drive, applied to the above transmission system capable of implementing four-wheel drive, including single-motor models and dual-motor models, where the single-motor models include a single-motor two-wheel drive model and a single-motor four-wheel drive model, and the dual-motor models include a dual-motor two-wheel drive model and a dual-motor four-wheel drive model.

Optionally, the odd shift motor or the even shift motor is used as a power source in the single-motor two-wheel drive model. When the odd shift motor is used as the power source in the single-motor two-wheel drive model, power is transmitted to the first output gear on an odd shaft and the rear-wheel output shaft gear through the first driving gear on an odd shaft, the first driven gear on an odd shaft or the second driving gear on an odd shaft, and the second driven gear on an odd shaft. In this case, the second coupling sleeve is coupled to the first output gear on an odd shaft, the front/rear drive shaft coupling sleeve is disconnected, and the vehicle operates in a single-motor rear-wheel drive model. When the second coupling sleeve is coupled to the second output gear on an odd shaft, the vehicle operates in a single-motor front-wheel drive model. When the even shift motor is used as the power source in the single-motor two-wheel drive model, power is transmitted to the first output gear on an even shaft and the rear-wheel output shaft gear through the first driving gear on an even shaft, the first driven gear on an even shaft or the second driving gear on an even shaft, and the second driven gear on an even shaft. In this case, the fourth coupling sleeve is coupled to the first output gear on an even shaft, the front/rear drive shaft coupling sleeve is disconnected, and the vehicle operates in a single-motor rear-wheel drive model. When the fourth coupling sleeve is coupled to the second output gear on an odd shaft, the vehicle operates in a single-motor front-wheel drive model.

Optionally, the odd shift motor or the even shift motor is used as a power source in the single-motor four-wheel drive model. When the odd shift motor is used as the power source in the single-motor four-wheel drive model, power is transmitted to the first output gear on an odd shaft and the rear-wheel output shaft gear through the first driving gear on an odd shaft, the first driven gear on an odd shaft or the second driving gear on an odd shaft, and the second driven gear on an odd shaft. In this case, the second coupling sleeve is coupled to the first output gear on an odd shaft or the second output gear on an odd shaft, and the front/rear drive shaft coupling sleeve is connected. When the even shift motor is used as the power source in the single-motor four-wheel drive model, power is transmitted to the first output gear on an even shaft and the rear-wheel output shaft gear through the first driving gear on an even shaft, the first driven gear on an even shaft or the second driving gear on an even shaft, and the second driven gear on an even shaft. In this case, the fourth coupling sleeve is coupled to the first output gear on an even shaft or the second output gear on an even shaft, and the front/rear drive shaft coupling sleeve is connected.

Optionally, in the dual-motor two-wheel-drive model, power output by the odd shift motor is transmitted to the first output gear on an odd shaft and the rear-wheel output shaft gear through the first driving gear on an odd shaft and the first driven gear on an odd shaft, and then to wheels through the rear-wheel drive shaft. Power generated by the even shift motor is transmitted to the first output gear on an even shaft and the rear-wheel output shaft gear through the first driving gear on an even shaft and the first driven gear on an even shaft, and then to wheels through the rear-wheel drive shaft. Torque generated by the odd shift motor and torque generated by the even shift motor are coupled and output through the first output gear on an odd shaft, the first output gear on an even shaft, and the rear-wheel output shaft gear. Alternatively, power output by the odd shift motor is transmitted to the second output gear on an odd shaft and the rear-wheel output shaft gear through the second driving gear on an odd shaft and the second driven gear on an odd shaft, and then to wheels through the rear-wheel drive shaft. Power generated by the even shift motor is transmitted to the second output gear on an even shaft and the rear-wheel output shaft gear through the second driving gear on an even shaft and the second driven gear on an even shaft, and then to wheels through the rear-wheel drive shaft. Torque generated by the odd shift motor and torque generated by the even shift motor are coupled and output through the second output gear on an odd shaft, the second output gear on an even shaft, and the rear-wheel output shaft gear.

Optionally, the dual-motor four-wheel drive model is classified into two types: a power-coupled four-wheel drive model and a four-wheel drive model in which two motors respectively drive front and rear shafts.

Optionally, in the power-coupled four-wheel drive model, based on the dual-motor two-wheel drive model, the front/rear drive shaft coupling sleeve is connected, and the power is coupled and then transmitted to four wheels through the front-wheel drive shaft and the rear-wheel drive shaft.

Optionally, in the four-wheel drive model in which two motors respectively drive front and rear shafts, the power generated by the odd shift motor serving as the power source is transmitted to the odd shift intermediate shaft through the first driving gear on an odd shaft and the first driven gear on an odd shaft or the second driving gear on an odd shaft and the second driven gear on an odd shaft. In this case, the second coupling sleeve is coupled to the first output gear on an odd shaft, and the power is transmitted to the rear-wheel drive shaft through the first output gear on an odd shaft and the rear-wheel output shaft gear, and then to two rear wheels. The power generated by the even shift motor serving as the power source is transmitted to the even shift intermediate shaft through the first driving gear on an even shaft and the first driven gear on an even shaft or the second driving gear on an even shaft and the second driven gear on an even shaft. In this case, the fourth coupling sleeve is connected to the second output gear on an even shaft, and the power is transmitted to the front-wheel drive shaft through the second output gear on an even shaft and the front-wheel output shaft gear, and then to two front wheels, implementing a four-wheel drive function. Alternatively, the power generated by the odd shift motor serving as the power source is transmitted to the odd shift intermediate shaft through the first driving gear on an odd shaft and the first driven gear on an odd shaft or the second driving gear on an odd shaft and the second driven gear on an odd shaft. In this case, the second coupling sleeve is connected to the second output gear on an odd shaft, and the power is transmitted to the front-wheel drive shaft through the second output gear on an odd shaft and the front-wheel output shaft gear, and then to two front wheels. The power generated by the even shift motor serving as the power source is transmitted to the even shift intermediate shaft through the first driving gear on an even shaft and the first driven gear on an even shaft or the second driving gear on an even shaft and the second driven gear on an even shaft. In this case, the fourth coupling sleeve is connected to the first output gear on an even shaft, and the power is transmitted to the rear-wheel drive shaft through the first output gear on an even shaft and the rear-wheel output shaft gear, and then to two rear wheels, implementing a four-wheel drive function.

Compared with the prior art, the disclosure has the following technical effects: in the disclosure, coordinated control of two motors allows the motors to operate with high efficiency to the maximum, which improves the efficiency of the transmission system. In addition, a four-wheel drive model and a two-wheel drive model are implemented through the coordinated control of two motors. Moreover, in the disclosure, sensor information is used to synchronously control a rotational speed during gear shift, which can reduce the impact during the gear shift.

BRIEF DESCRIPTION OF THE DRAWINGS

The disclosure is described below in detail with reference to the accompanying drawings.

DETAILED DESCRIPTION

Figure 1:
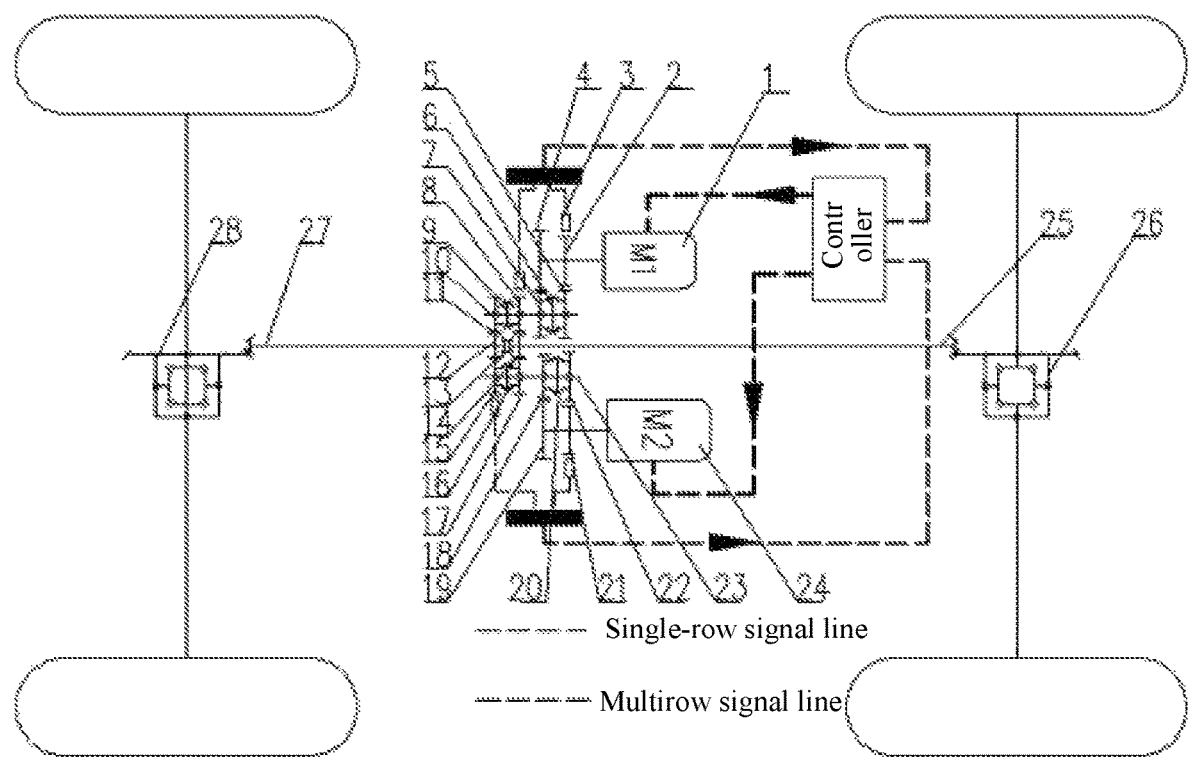
FIG. 1 is a schematic structural diagram of a transmission system capable of implementing four-wheel drive according to an example of the disclosure.

FIG. 1 is a schematic structural diagram of a transmission system capable of implementing four-wheel drive according to an example of the disclosure. As shown in FIG. 1, the transmission system capable of implementing four-wheel drive includes an odd shift motor 1, an even shift motor 24, a front-wheel drive shaft 27, a rear-wheel drive shaft 25, a front-wheel output shaft gear 12 disposed on the front-wheel drive shaft 27, and a rear-wheel output shaft gear 14 disposed on the rear-wheel drive shaft 25. The front-wheel output shaft gear 12 and the rear-wheel output shaft gear 14 are connected by a front/rear drive shaft coupling sleeve 13. A first driving gear 2 on an odd shift and a second driving gear 4 on an odd shaft are disposed on an output shaft of the odd shift motor 1 along a direction away from the odd shift motor 1. The first driving gear 2 on an odd shift is engaged with a first driven gear 5 on an odd shaft. The second driving gear 4 on an odd shaft is engaged with a second driven gear 7 on an odd shaft. The first driven gear 5 on an odd shaft and the second driven gear 7 on an odd shaft are connected by a first coupling sleeve 6. An odd shift intermediate shaft 10 that penetrates the first driven gear 5 on an odd shaft, the second driven gear 7 on an odd shaft, and the first coupling sleeve 6 is further included. A first output gear 8 on an odd shaft that is engaged with the rear-wheel output shaft gear 14 and a second output gear 11 on an odd shaft that is engaged with the front-wheel output shaft gear 12 are further disposed on the odd shift intermediate shaft 10. The first output gear 8 on an odd shaft and the second output gear 11 on an odd shaft are connected by a second coupling sleeve 9. A first driving gear 21 on an even shaft and a second driving gear 19 on an even shaft are disposed on an output shaft of the even shift motor 24 along a direction away from the even shift motor 24. The first driving gear 21 on an even shaft is engaged with a first driven gear 22 on an even shaft. The second driving gear 19 on an even shaft is engaged with a second driven gear 18 on an even shaft. The first driven gear 22 on an even shaft and the second driven gear 18 on an even shaft are connected by a third coupling sleeve 20. An even shift intermediate shaft 23 that penetrates the first driven gear 22 on an even shaft, the second driven gear 18 on an even shaft, and the third coupling sleeve 20 is further included. A first output gear 17 on an even shaft that is engaged with the rear-wheel output shaft gear 14 and a second output gear 15 on an even shaft that is engaged with the front-wheel output shaft gear 12 are further disposed on the even shift intermediate shaft 23. The first output gear 17 on an even shaft and the second output gear 15 on an even shaft are connected by a fourth coupling sleeve 16.

The transmission system further includes a speed sensor 3 configured to monitor the speed of the first driving gear 2 on an odd shift. The rear-wheel drive shaft 25 is further connected to a rear shaft differential 26. The front-wheel drive shaft 27 is further connected to a front shaft differential 28.

The disclosure further provides an operating model applied to the transmission system capable of implementing four-wheel drive, including single-motor models and dual-motor models. The single-motor models include a single-motor two-wheel drive model and a single-motor four-wheel-drive model. The dual-motor models include a dual-motor two-wheel-drive model and a dual-motor four-wheel-drive model.

Figure 2:
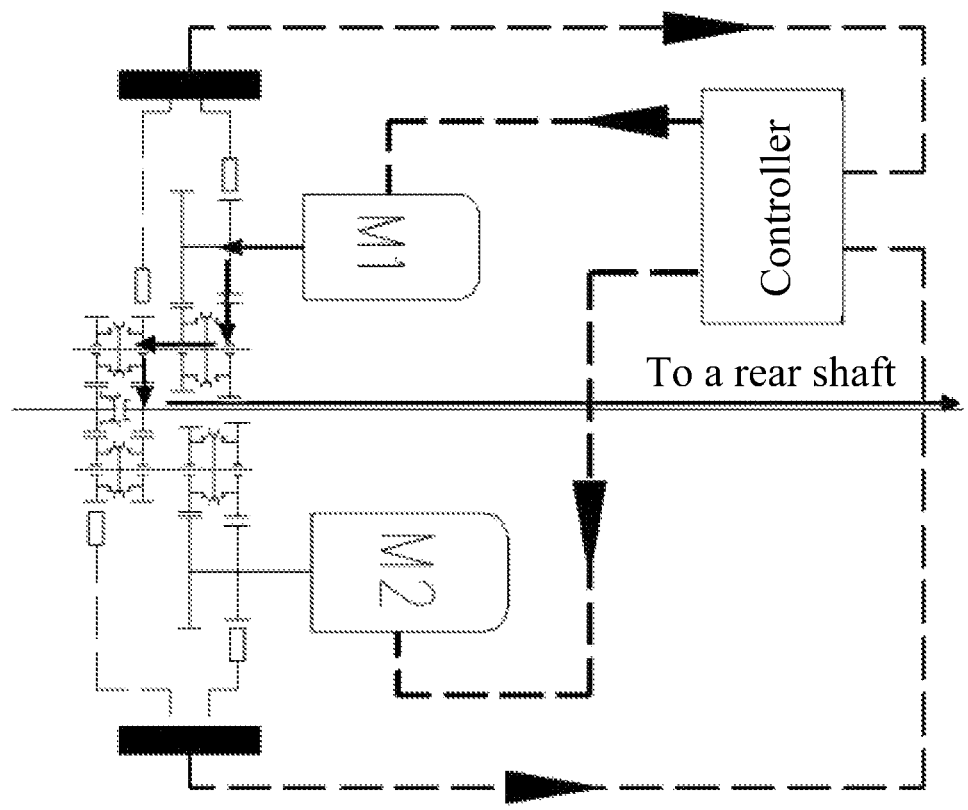
FIG. 2 is a diagram of a power flow when an odd shift motor serves as a power source to drive rear wheels in a single-motor two-wheel drive model according to an example of the disclosure.
Figure 3:
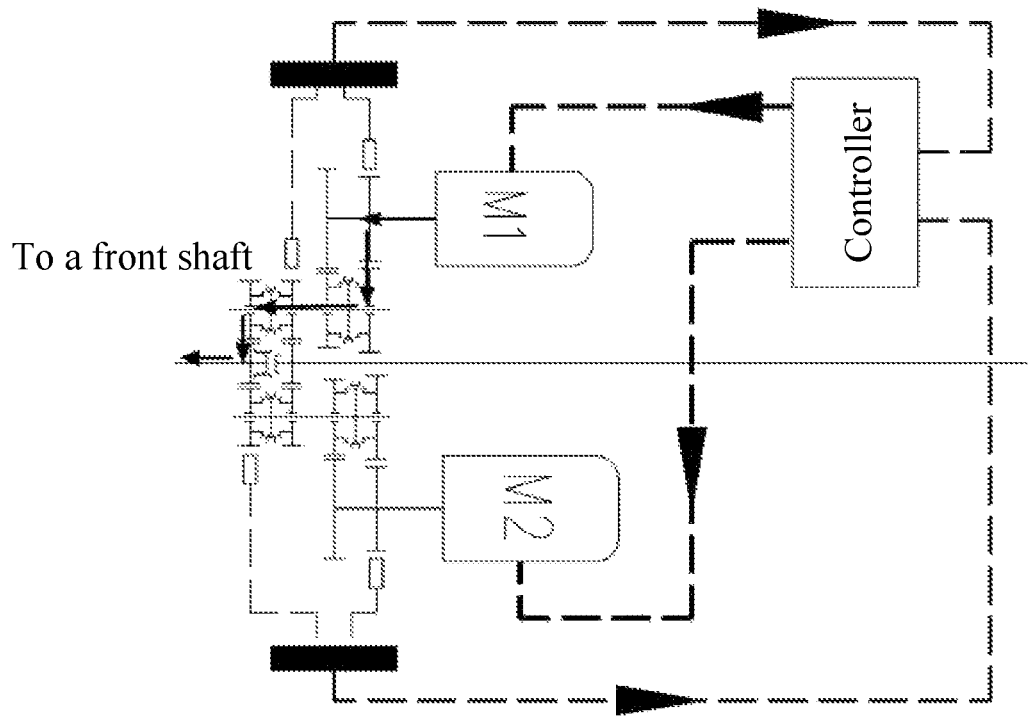
FIG. 3 is a diagram of a power flow when an odd shift motor serves as a power source to drive front wheels in a single-motor two-wheel drive model according to an example of the disclosure.

The odd shift motor 1 or the even shift motor 24 is used as a power source in the single-motor two-wheel drive model. As shown in FIG. 2 and FIG. 3, when the odd shift motor 1 is used as the power source in the single-motor two-wheel drive model, power is transmitted to the first output gear 8 on an odd shaft and the rear-wheel output shaft gear 14 through the first driving gear 2 on an odd shaft, the first driven gear 5 on an odd shaft or the second driving gear 4 on an odd shaft, and the second driven gear 7 on an odd shaft. In this case, the second coupling sleeve 9 is coupled to the first output gear 8 on an odd shaft, the front/rear drive shaft coupling sleeve 13 is disconnected, and the vehicle operates in a single-motor rear-wheel drive model. When the second coupling sleeve 9 is coupled to the second output gear 11 on an odd shaft, the vehicle operates in a single-motor front-wheel drive model.

When the even shift motor 24 is used as the power source in the single-motor two-wheel drive model, power is transmitted to the first output gear 17 on an even shaft and the rear-wheel output shaft gear 14 through the first driving gear 21 on an even shaft, the first driven gear 22 on an even shaft or the second driving gear 19 on an even shaft, and the second driven gear 18 on an even shaft. In this case, the fourth coupling sleeve 16 is coupled to the first output gear 17 on an even shaft, the front/rear drive shaft coupling sleeve 13 is disconnected, and the vehicle operates in a single-motor rear-wheel drive model. When the fourth coupling sleeve 16 is coupled to the second output gear 15 on an even shaft, the vehicle operates in a single-motor front-wheel drive model.

The odd shift motor 1 or the even shift motor 24 is used as a power source in the single-motor four-wheel drive model. When the odd shift motor 1 is used as the power source, power is transmitted to the first output gear 8 on an odd shaft and the rear-wheel output shaft gear 14 through the first driving gear 2 on an odd shaft, the first driven gear 5 on an odd shaft or the second driving gear 4 on an odd shaft, and the second driven gear 7 on an odd shaft. In this case, the second coupling sleeve 9 is coupled to the first output gear 8 on an odd shaft or the second output gear 11 on an odd shaft, and the front/rear drive shaft coupling sleeve 13 is connected. When the even shift motor 24 is used as the power source, power is transmitted to the first output gear 17 on an even shaft and the rear-wheel output shaft gear 14 through the first driving gear 21 on an even shaft, the first driven gear 22 on an even shaft or the second driving gear 19 on an even shaft, and the second driven gear 18 on an even shaft. In this case, the fourth coupling sleeve 16 is coupled to the first output gear 17 on an even shaft or the second output gear 15 on an even shaft, and the front/rear drive shaft coupling sleeve 13 is connected.

Figure 4:
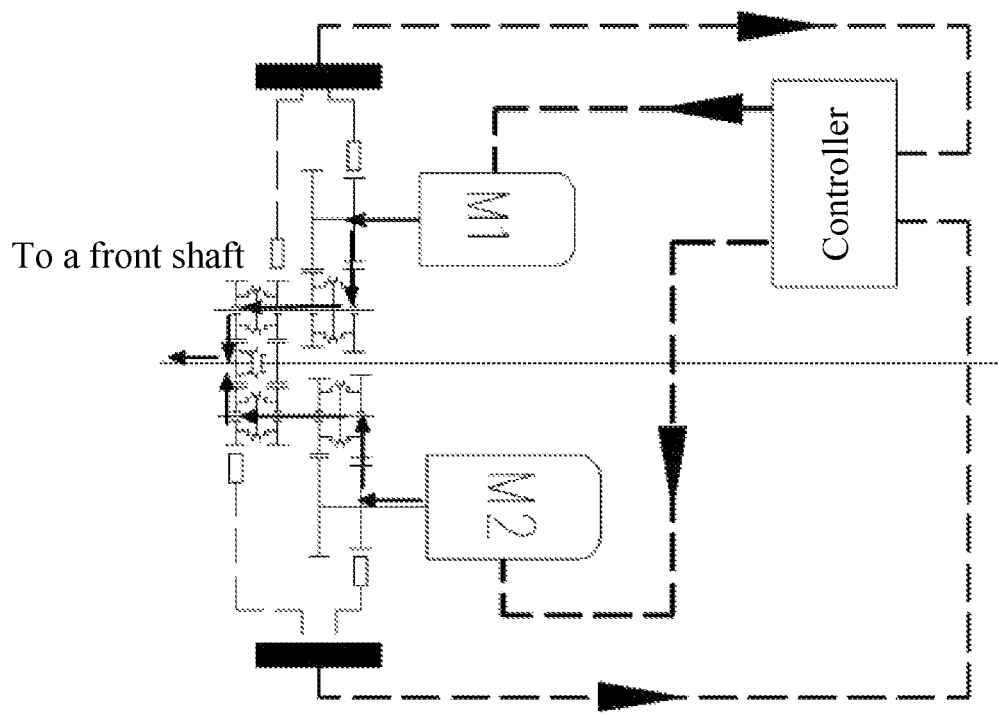
FIG. 4 is a diagram of a power flow when front wheels are driven in a dual-motor two-wheel drive model according to an example of the disclosure.
Figure 5:
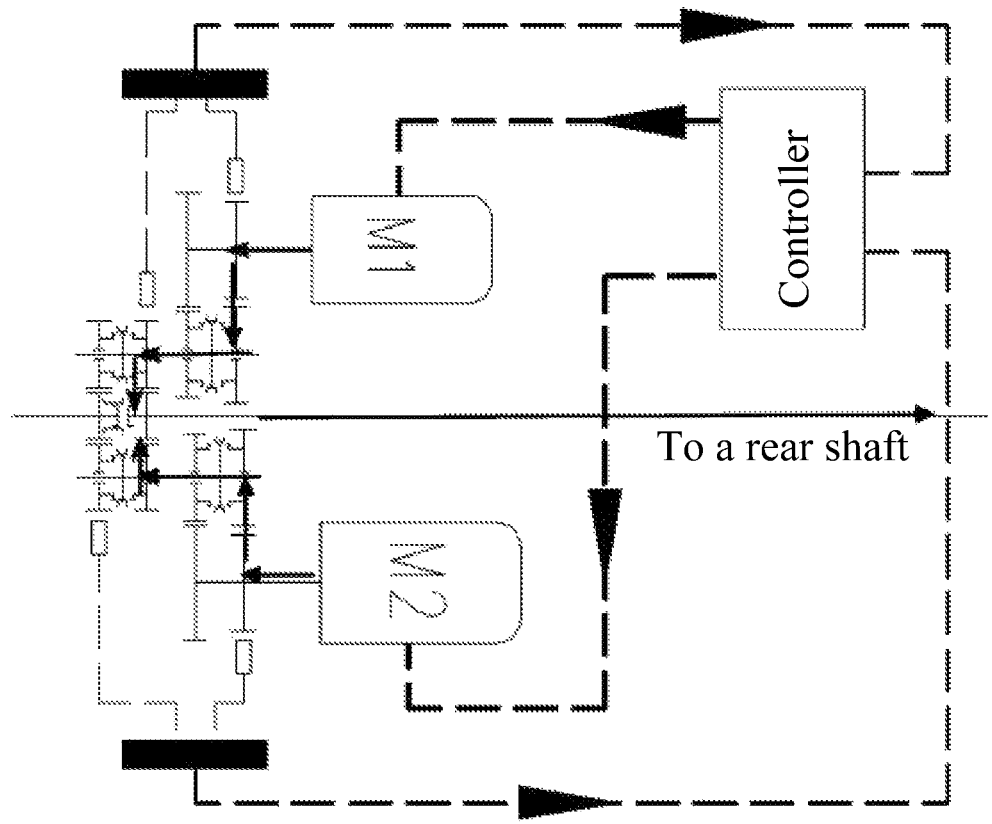
FIG. 5 is a diagram of a power flow when rear wheels are driven in a dual-motor two-wheel drive model according to an example of the disclosure.

As shown in FIG. 4 and FIG. 5, in the dual-motor two-wheel-drive model, power output by the odd shift motor 1 is transmitted to the first output gear 8 on an odd shaft and the rear-wheel output shaft gear 14 through the first driving gear 2 on an odd shaft and the first driven gear 5 on an odd shaft, and then to wheels through the rear-wheel drive shaft 25 and the rear shaft differential 26. Power generated by the even shift motor 24 is transmitted to the first output gear 17 on an even shaft and the rear-wheel output shaft gear 14 through the first driving gear 21 on an even shaft and the first driven gear 22 on an even shaft, and then to wheels through the rear-wheel drive shaft 25 and the rear shaft differential 26. Torque generated by the odd shift motor 1 and torque generated by the even shift motor 24 are coupled and output through the first output gear 8 on an odd shaft, the first output gear 17 on an even shaft, and the rear-wheel output shaft gear 14. Alternatively, power output by the odd shift motor 1 is transmitted to the second output gear 11 on an odd shaft and the rear-wheel output shaft gear 14 through the second driving gear 4 on an odd shaft and the second driven gear 7 on an odd shaft, and then to wheels through the rear-wheel drive shaft 25 and the rear shaft differential 26. Power generated by the even shift motor 24 is transmitted to the second output gear 15 on an even shaft and the rear-wheel output shaft gear 14 through the second driving gear 19 on an even shaft and the second driven gear 18 on an even shaft, and then to wheels through the rear-wheel drive shaft 25 and the rear shaft differential 26. Torque generated by the odd shift motor 1 and torque generated by the even shift motor 24 are coupled and output through the second output gear 11 on an odd shaft, the second output gear 15 on an even shaft, and the rear-wheel output shaft gear 14.

Figure 6:
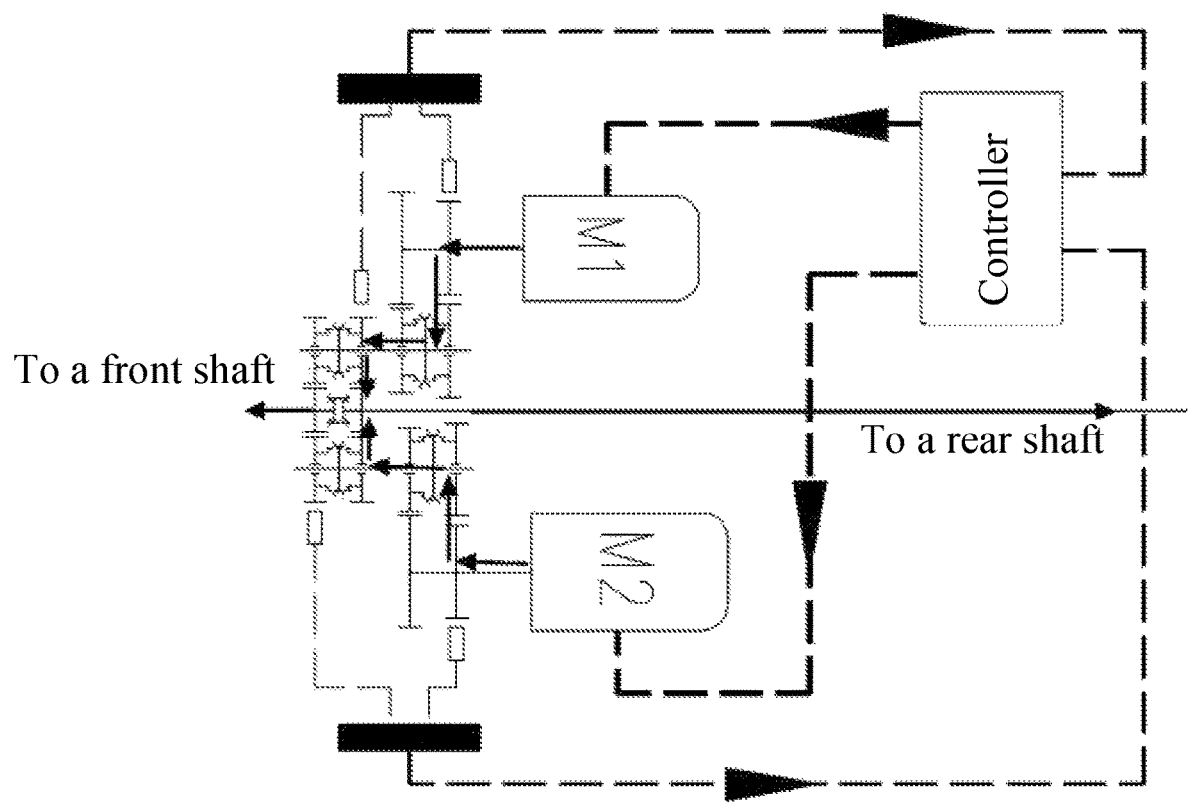
FIG. 6 is a diagram of a power flow of a power-coupled four-wheel drive model in a dual-motor four-wheel drive model according to an example of the disclosure.

The dual-motor four-wheel drive model is classified into two types: a power-coupled four-wheel drive model and a four-wheel drive model in which two motors respectively drive front and rear shafts. As shown in FIG. 6, in the power-coupled four-wheel drive model, based on the dual-motor two-wheel drive model, the front/rear drive shaft coupling sleeve 13 is connected, and the power is coupled and then transmitted to four wheels through the front-wheel drive shaft 27 and the rear-wheel drive shaft 25.

Figure 7:
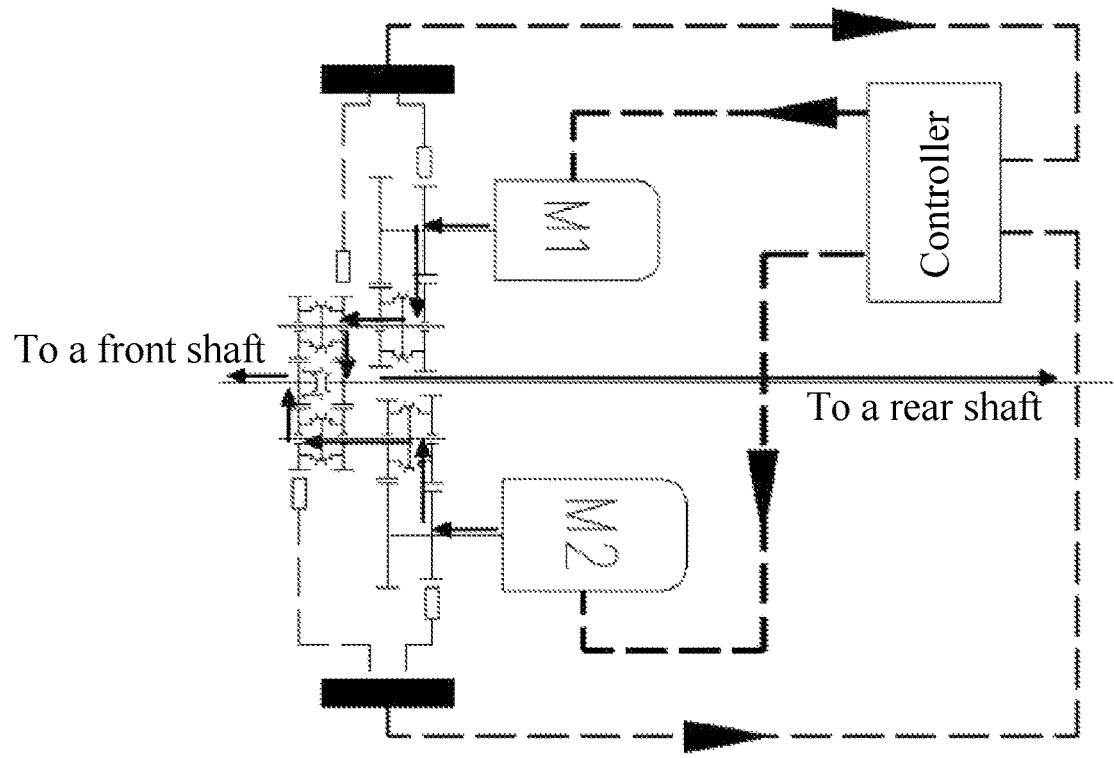
FIG. 7 is a diagram of a power flow of a four-wheel drive model in which two motors respectively drive front and rear shafts in a dual-motor four-wheel drive model according to an example of the disclosure.

As shown in FIG. 7, in the four-wheel drive model in which two motors respectively drive front and rear shafts, power generated by the odd shift motor 1 serving as the power source is transmitted to the odd shift intermediate shaft 10 through the first driving gear 2 on an odd shaft and the first driven gear 5 on an odd shaft or the second driving gear 4 on an odd shaft and the second driven gear 7 on an odd shaft. In this case, the second coupling sleeve 9 is coupled to the first output gear 8 on an odd shaft, and the power is transmitted to the rear-wheel drive shaft 25 through the first output gear 8 on an odd shaft and the rear-wheel output shaft gear 14, and then to two rear wheels through the rear shaft differential 26. Power generated by the even shift motor 24 serving as the power source is transmitted to the even shift intermediate shaft 23 through the first driving gear 21 on an even shaft and the first driven gear 22 on an even shaft or the second driving gear 19 on an even shaft and the second driven gear 18 on an even shaft. In this case, the fourth coupling sleeve 16 is connected to the second output gear 15 on an even shaft, and the power is transmitted to the front-wheel drive shaft 27 through the second output gear 15 on an even shaft and the front-wheel output shaft gear 12, and then to two front wheels through the front wheel differential 28. In this way, a four-wheel drive function is implemented. Alternatively, power generated by the odd shift motor 1 serving as the power source is transmitted to the odd shift intermediate shaft 10 through the first driving gear 2 on an odd shaft and the first driven gear 5 on an odd shaft or the second driving gear 4 on an odd shaft and the second driven gear 7 on an odd shaft. In this case, the second coupling sleeve 9 is connected to the second output gear 11 on an odd shaft, and the power is transmitted to the front-wheel drive shaft 27 through the second output gear 11 on an odd shaft and the front-wheel output shaft gear 12, and then to two front wheels through the front wheel differential 28. Power generated by the even shift motor 24 serving as the power source is transmitted to the even shift intermediate shaft 23 through the first driving gear 21 on an even shaft and the first driven gear 22 on an even shaft or the second driving gear 19 on an even shaft and the second driven gear 18 on an even shaft. In this case, the fourth coupling sleeve 16 is connected to the first output gear 17 on an even shaft, and the power is transmitted to the rear-wheel drive shaft 25 through the first output gear 17 on an even shaft and the rear-wheel output shaft gear 14, and then to two rear wheels through the rear shaft differential 26. In this way, a four-wheel drive function is implemented.

In the disclosure, coordinated control of two motors allows the motors to operate with high efficiency to the maximum, which improves the efficiency of the transmission system. In addition, the four-wheel drive model and the two-wheel drive model are implemented through the coordinated control of two motors. Moreover, in the disclosure, sensor information is used to synchronously control a rotational speed during gear shift, which can reduce the impact during the gear shift.

Several examples are used for illustration of the principles and implementation methods of the disclosure. The description of the examples is used to help understand the method and core idea of the disclosure. In addition, a person skilled in the art can make various modifications in terms of specific examples and scope of application in accordance with the idea of the disclosure. In conclusion, the content of this specification shall not be construed as a limitation to the disclosure.

The invention claimed is:

1. A transmission system capable of implementing four-wheel drive, comprising: an odd shift motor, an even shift motor, a front-wheel drive shaft, a rear-wheel drive shaft, a front-wheel output shaft gear disposed on the front-wheel drive shaft, and a rear-wheel output shaft gear disposed on the rear-wheel drive shaft, wherein the front-wheel output shaft gear and the rear-wheel output shaft gear are connected by a front/rear drive shaft coupling sleeve; a first driving gear on an odd shaft and a second driving gear on an odd shaft are disposed on an output shaft of the odd shift motor along a direction away from the odd shift motor; the first driving gear on an odd shaft is engaged with a first driven gear on an odd shaft, the second driving gear on an odd shaft is engaged with a second driven gear on an odd shift, and the first driven gear on an odd shaft and the second driven gear on an odd shaft are connected by a first coupling sleeve; an odd shift intermediate shaft that penetrates the first driven gear on an odd shaft, the second driven gear on an odd shaft, and the first coupling sleeve is further comprised; a first output gear on an odd shaft that is engaged with the rear-wheel output shaft gear and a second output gear on an odd shaft that is engaged with the front-wheel output shaft gear are further disposed on the odd shift intermediate shaft; the first output gear on an odd shaft and the second output gear on an odd shaft are connected by a second coupling sleeve; a first driving gear on an even shaft and a second driving gear on an even shaft are disposed on an output shaft of the even shift motor along an direction away from the even shift motor; the first driving gear on an even shaft is engaged with a first driven gear on an even shaft, the second driving gear on an even shaft is engaged with a second driven gear on an even shaft, and the first driven gear on an even shaft and the second driven gear on an even shaft are connected by a third coupling sleeve; an even shift intermediate shaft that penetrates the first driven gear on an even shaft, the second driven gear on an even shaft, and the third coupling sleeve is further comprised; a first output gear on an even shaft that is engaged with the rear-wheel output shaft gear and a second output gear on an even shaft that is engaged with the front-wheel output shaft gear are further disposed on the even shift intermediate shaft; and the first output gear on an even shaft and the second output gear on an even shaft are connected by a fourth coupling sleeve.

2. The transmission system capable of implementing four-wheel drive according to claim 1, further comprising a speed sensor, wherein the speed sensor is connected to the first driving gear on an odd shaft and configured to monitor the speed of the first driving gear on an odd shaft.

3. The transmission system capable of implementing four-wheel drive according to claim 1, wherein the rear-wheel drive shaft is further connected to a rear shaft differential, and the front-wheel drive shaft is further connected to a front shaft differential.

4. An operating model of a transmission system capable of implementing four-wheel drive, applied to the transmission system capable of implementing four-wheel drive according to claim 1, comprising single-motor models and dual-motor models, wherein the single-motor models comprise a single-motor two-wheel drive model and a single-motor four-wheel drive model, and the dual-motor models comprise a dual-motor two-wheel drive model and a dual-motor four-wheel drive model.

5. An operating model of a transmission system capable of implementing four-wheel drive, applied to the transmission system capable of implementing four-wheel drive according to claim 2, comprising single-motor models and dual-motor models, wherein the single-motor models comprise a single-motor two-wheel drive model and a single-motor four-wheel drive model, and the dual-motor models comprise a dual-motor two-wheel drive model and a dual-motor four-wheel drive model.

6. An operating model of a transmission system capable of implementing four-wheel drive, applied to the transmission system capable of implementing four-wheel drive according to claim 3, comprising single-motor models and dual-motor models, wherein the single-motor models comprise a single-motor two-wheel drive model and a single-motor four-wheel drive model, and the dual-motor models comprise a dual-motor two-wheel drive model and a dual-motor four-wheel drive model.

7. The operating model of a transmission system capable of implementing four-wheel drive according to claim 4, wherein the odd shift motor or the even shift motor is used as a power source in the single-motor two-wheel drive model; when the odd shift motor is used as the power source in the single-motor two-wheel drive model, power is transmitted to the first output gear on an odd shaft and the rear-wheel output shaft gear through the first driving gear on an odd shaft, the first driven gear on an odd shaft or the second driving gear on an odd shaft, and the second driven gear on an odd shaft; in this case, the second coupling sleeve is coupled to the first output gear on an odd shaft, the front/rear drive shaft coupling sleeve is disconnected, and the vehicle operates in a single-motor rear-wheel drive model; when the second coupling sleeve is coupled to the second output gear on an odd shaft, the vehicle operates in a single-motor front-wheel drive model; when the even shift motor is used as the power source in the single-motor two-wheel drive model, power is transmitted to the first output gear on an even shaft and the rear-wheel output shaft gear through the first driving gear on an even shaft, the first driven gear on an even shaft or the second driving gear on an even shaft, and the second driven gear on an even shaft; in this case, the fourth coupling sleeve is coupled to the first output gear on an even shaft, the front/rear drive shaft coupling sleeve is disconnected, and the vehicle operates in a single-motor rear-wheel drive model; and when the fourth coupling sleeve is coupled to the second output gear on an odd shaft, the vehicle operates in a single-motor front-wheel drive model.

8. The operating model of a transmission system capable of implementing four-wheel drive according to claim 5, wherein the odd shift motor or the even shift motor is used as a power source in the single-motor two-wheel drive model; when the odd shift motor is used as the power source in the single-motor two-wheel drive model, power is transmitted to the first output gear on an odd shaft and the rear-wheel output shaft gear through the first driving gear on an odd shaft, the first driven gear on an odd shaft or the second driving gear on an odd shaft, and the second driven gear on an odd shaft; in this case, the second coupling sleeve is coupled to the first output gear on an odd shaft, the front/rear drive shaft coupling sleeve is disconnected, and the vehicle operates in a single-motor rear-wheel drive model; when the second coupling sleeve is coupled to the second output gear on an odd shaft, the vehicle operates in a single-motor front-wheel drive model; when the even shift motor is used as the power source in the single-motor two-wheel drive model, power is transmitted to the first output gear on an even shaft and the rear-wheel output shaft gear through the first driving gear on an even shaft, the first driven gear on an even shaft or the second driving gear on an even shaft, and the second driven gear on an even shaft; in this case, the fourth coupling sleeve is coupled to the first output gear on an even shaft, the front/rear drive shaft coupling sleeve is disconnected, and the vehicle operates in a single-motor rear-wheel drive model; and when the fourth coupling sleeve is coupled to the second output gear on an odd shaft, the vehicle operates in a single-motor front-wheel drive model.

9. The operating model of a transmission system capable of implementing four-wheel drive according to claim 6, wherein the odd shift motor or the even shift motor is used as a power source in the single-motor two-wheel drive model; when the odd shift motor is used as the power source in the single-motor two-wheel drive model, power is transmitted to the first output gear on an odd shaft and the rear-wheel output shaft gear through the first driving gear on an odd shaft, the first driven gear on an odd shaft or the second driving gear on an odd shaft, and the second driven gear on an odd shaft; in this case, the second coupling sleeve is coupled to the first output gear on an odd shaft, the front/rear drive shaft coupling sleeve is disconnected, and the vehicle operates in a single-motor rear-wheel drive model; when the second coupling sleeve is coupled to the second output gear on an odd shaft, the vehicle operates in a single-motor front-wheel drive model; when the even shift motor is used as the power source in the single-motor two-wheel drive model, power is transmitted to the first output gear on an even shaft and the rear-wheel output shaft gear through the first driving gear on an even shaft, the first driven gear on an even shaft or the second driving gear on an even shaft, and the second driven gear on an even shaft; in this case, the fourth coupling sleeve is coupled to the first output gear on an even shaft, the front/rear drive shaft coupling sleeve is disconnected, and the vehicle operates in a single-motor rear-wheel drive model; and when the fourth coupling sleeve is coupled to the second output gear on an odd shaft, the vehicle operates in a single-motor front-wheel drive model.

10. The operating model of a transmission system capable of implementing four-wheel drive according to claim 4, wherein the odd shift motor or the even shift motor is used as a power source in the single-motor four-wheel drive model; when the odd shift motor is used as the power source in the single-motor four-wheel drive model, power is transmitted to the first output gear on an odd shaft and the rear-wheel output shaft gear through the first driving gear on an odd shaft, the first driven gear on an odd shaft or the second driving gear on an odd shaft, and the second driven gear on an odd shaft; in this case, the second coupling sleeve is coupled to the first output gear on an odd shaft or the second output gear on an odd shaft, and the front/rear drive shaft coupling sleeve is connected; when the even shift motor is used as the power source in the single-motor four-wheel drive model, power is transmitted to the first output gear on an even shaft and the rear-wheel output shaft gear through the first driving gear on an even shaft, the first driven gear on an even shaft or the second driving gear on an even shaft, and the second driven gear on an even shaft; in this case, the fourth coupling sleeve is coupled to the first output gear on an even shaft or the second output gear on an even shaft, and the front/rear drive shaft coupling sleeve is connected.

11. The operating model of a transmission system capable of implementing four-wheel drive according to claim 5, wherein the odd shift motor or the even shift motor is used as a power source in the single-motor four-wheel drive model; when the odd shift motor is used as the power source in the single-motor four-wheel drive model, power is transmitted to the first output gear on an odd shaft and the rear-wheel output shaft gear through the first driving gear on an odd shaft, the first driven gear on an odd shaft or the second driving gear on an odd shaft, and the second driven gear on an odd shaft; in this case, the second coupling sleeve is coupled to the first output gear on an odd shaft or the second output gear on an odd shaft, and the front/rear drive shaft coupling sleeve is connected; when the even shift motor is used as the power source in the single-motor four-wheel drive model, power is transmitted to the first output gear on an even shaft and the rear-wheel output shaft gear through the first driving gear on an even shaft, the first driven gear on an even shaft or the second driving gear on an even shaft, and the second driven gear on an even shaft; in this case, the fourth coupling sleeve is coupled to the first output gear on an even shaft or the second output gear on an even shaft, and the front/rear drive shaft coupling sleeve is connected.

12. The operating model of a transmission system capable of implementing four-wheel drive according to claim 6, wherein the odd shift motor or the even shift motor is used as a power source in the single-motor four-wheel drive model; when the odd shift motor is used as the power source in the single-motor four-wheel drive model, power is transmitted to the first output gear on an odd shaft and the rear-wheel output shaft gear through the first driving gear on an odd shaft, the first driven gear on an odd shaft or the second driving gear on an odd shaft, and the second driven gear on an odd shaft; in this case, the second coupling sleeve is coupled to the first output gear on an odd shaft or the second output gear on an odd shaft, and the front/rear drive shaft coupling sleeve is connected; when the even shift motor is used as the power source in the single-motor four-wheel drive model, power is transmitted to the first output gear on an even shaft and the rear-wheel output shaft gear through the first driving gear on an even shaft, the first driven gear on an even shaft or the second driving gear on an even shaft, and the second driven gear on an even shaft; in this case, the fourth coupling sleeve is coupled to the first output gear on an even shaft or the second output gear on an even shaft, and the front/rear drive shaft coupling sleeve is connected.

13. The operating model of a transmission system capable of implementing four-wheel drive according to claim 4, wherein in the dual-motor two-wheel-drive model, power output by the odd shift motor is transmitted to the first output gear on an odd shaft and the rear-wheel output shaft gear through the first driving gear on an odd shaft and the first driven gear on an odd shaft, and then to wheels through the rear-wheel drive shaft; power generated by the even shift motor is transmitted to the first output gear on an even shaft and the rear-wheel output shaft gear through the first driving gear on an even shaft and the first driven gear on an even shaft, and then to wheels through the rear-wheel drive shaft; torque generated by the odd shift motor and torque generated by the even shift motor are coupled and output through the first output gear on an odd shaft, the first output gear on an even shaft, and the rear-wheel output shaft gear; alternatively, power output by the odd shift motor is transmitted to the second output gear on an odd shaft and the rear-wheel output shaft gear through the second driving gear on an odd shaft and the second driven gear on an odd shaft, and then to wheels through the rear-wheel drive shaft; power generated by the even shift motor is transmitted to the second output gear on an even shaft and the rear-wheel output shaft gear through the second driving gear on an even shaft and the second driven gear on an even shaft, and then to wheels through the rear-wheel drive shaft; torque generated by the odd shift motor and torque generated by the even shift motor are coupled and output through the second output gear on an odd shaft, the second output gear on an even shaft, and the rear-wheel output shaft gear.

14. The operating model of a transmission system capable of implementing four-wheel drive according to claim 5, wherein in the dual-motor two-wheel-drive model, power output by the odd shift motor is transmitted to the first output gear on an odd shaft and the rear-wheel output shaft gear through the first driving gear on an odd shaft and the first driven gear on an odd shaft, and then to wheels through the rear-wheel drive shaft; power generated by the even shift motor is transmitted to the first output gear on an even shaft and the rear-wheel output shaft gear through the first driving gear on an even shaft and the first driven gear on an even shaft, and then to wheels through the rear-wheel drive shaft; torque generated by the odd shift motor and torque generated by the even shift motor are coupled and output through the first output gear on an odd shaft, the first output gear on an even shaft, and the rear-wheel output shaft gear; alternatively, power output by the odd shift motor is transmitted to the second output gear on an odd shaft and the rear-wheel output shaft gear through the second driving gear on an odd shaft and the second driven gear on an odd shaft, and then to wheels through the rear-wheel drive shaft; power generated by the even shift motor is transmitted to the second output gear on an even shaft and the rear-wheel output shaft gear through the second driving gear on an even shaft and the second driven gear on an even shaft, and then to wheels through the rear-wheel drive shaft; torque generated by the odd shift motor and torque generated by the even shift motor are coupled and output through the second output gear on an odd shaft, the second output gear on an even shaft, and the rear-wheel output shaft gear.

15. The operating model of a transmission system capable of implementing four-wheel drive according to claim 6, wherein in the dual-motor two-wheel-drive model, power output by the odd shift motor is transmitted to the first output gear on an odd shaft and the rear-wheel output shaft gear through the first driving gear on an odd shaft and the first driven gear on an odd shaft, and then to wheels through the rear-wheel drive shaft; power generated by the even shift motor is transmitted to the first output gear on an even shaft and the rear-wheel output shaft gear through the first driving gear on an even shaft and the first driven gear on an even shaft, and then to wheels through the rear-wheel drive shaft; torque generated by the odd shift motor and torque generated by the even shift motor are coupled and output through the first output gear on an odd shaft, the first output gear on an even shaft, and the rear-wheel output shaft gear; alternatively, power output by the odd shift motor is transmitted to the second output gear on an odd shaft and the rear-wheel output shaft gear through the second driving gear on an odd shaft and the second driven gear on an odd shaft, and then to wheels through the rear-wheel drive shaft; power generated by the even shift motor is transmitted to the second output gear on an even shaft and the rear-wheel output shaft gear through the second driving gear on an even shaft and the second driven gear on an even shaft, and then to wheels through the rear-wheel drive shaft; torque generated by the odd shift motor and torque generated by the even shift motor are coupled and output through the second output gear on an odd shaft, the second output gear on an even shaft, and the rear-wheel output shaft gear.

16. The operating model of a transmission system capable of implementing four-wheel drive according to claim 13, wherein the dual-motor four-wheel drive model is classified into two types: a power-coupled four-wheel drive model and a four-wheel drive model in which two motors respectively drive front and rear shafts.

17. The operating model of a transmission system capable of implementing four-wheel drive according to claim 14, wherein the dual-motor four-wheel drive model is classified into two types: a power-coupled four-wheel drive model and a four-wheel drive model in which two motors respectively drive front and rear shafts.

18. The operating model of a transmission system capable of implementing four-wheel drive according to claim 15, wherein the dual-motor four-wheel drive model is classified into two types: a power-coupled four-wheel drive model and a four-wheel drive model in which two motors respectively drive front and rear shafts.

19. The operating model of a transmission system capable of implementing four-wheel drive according to claim 16, wherein in the power-coupled four-wheel drive model, based on the dual-motor two-wheel drive model, the front/rear drive shaft coupling sleeve is connected, and the power is coupled and then transmitted to four wheels through the front-wheel drive shaft and the rear-wheel drive shaft.

20. The operating model of a transmission system capable of implementing four-wheel drive according to claim 16, wherein in the four-wheel drive model in which two motors respectively drive front and rear shafts, the power generated by the odd shift motor serving as the power source is transmitted to the odd shift intermediate shaft through the first driving gear on an odd shaft and the first driven gear on an odd shaft or the second driving gear on an odd shaft and the second driven gear on an odd shaft; in this case, the second coupling sleeve is coupled to the first output gear on an odd shaft, and the power is transmitted to the rear-wheel drive shaft through the first output gear on an odd shaft and the rear-wheel output shaft gear, and then to two rear wheels; the power generated by the even shift motor serving as the power source is transmitted to the even shift intermediate shaft through the first driving gear on an even shaft and the first driven gear on an even shaft or the second driving gear on an even shaft and the second driven gear on an even shaft; in this case, the fourth coupling sleeve is connected to the second output gear on an even shaft, and the power is transmitted to the front-wheel drive shaft through the second output gear on an even shaft and the front-wheel output shaft gear, and then to two front wheels, implementing a four-wheel drive function; alternatively, the power generated by the odd shift motor serving as the power source is transmitted to the odd shift intermediate shaft through the first driving gear on an odd shaft and the first driven gear on an odd shaft or the second driving gear on an odd shaft and the second driven gear on an odd shaft; in this case, the second coupling sleeve is connected to the second output gear on an odd shaft, and the power is transmitted to the front-wheel drive shaft through the second output gear on an odd shaft and the front-wheel output shaft gear, and then to two front wheels; the power generated by the even shift motor serving as the power source is transmitted to the even shift intermediate shaft through the first driving gear on an even shaft and the first driven gear on an even shaft or the second driving gear on an even shaft and the second driven gear on an even shaft; in this case, the fourth coupling sleeve is connected to the first output gear on an even shaft, and the power is transmitted to the rear-wheel drive shaft through the first output gear on an even shaft and the rear-wheel output shaft gear, and then to two rear wheels, implementing a four-wheel drive function.

* * * * *